Figure 1:
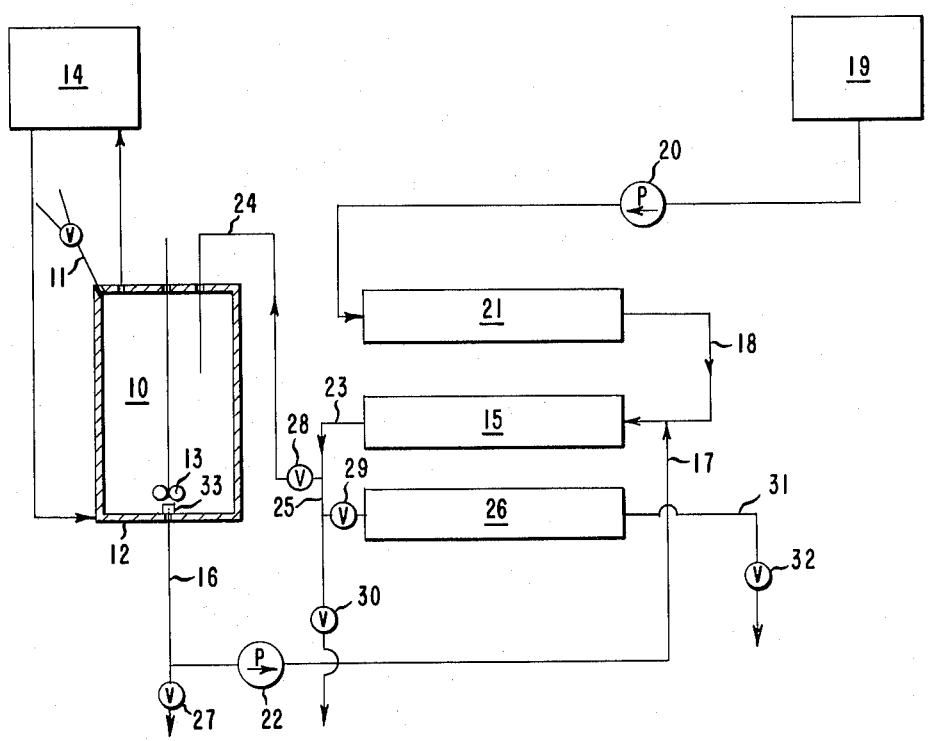

June 21, 1966     H. B. WHITFIELD, JR., ET AL     3,257,335
TWO STAGE PROCESS FOR DEPOLYMERIZING POLYESTERS
Filed Dec. 6, 1962     2 Sheets-Sheet 1

INVENTORS
FRANK EDWARD HOFFMAN
CHARLES EDWARD HOLCOMB
HAROLD BARNARD WHITFIELD, JR.
FREDERICK ROBERT WINTER

BY *Robert W Black*

ATTORNEY

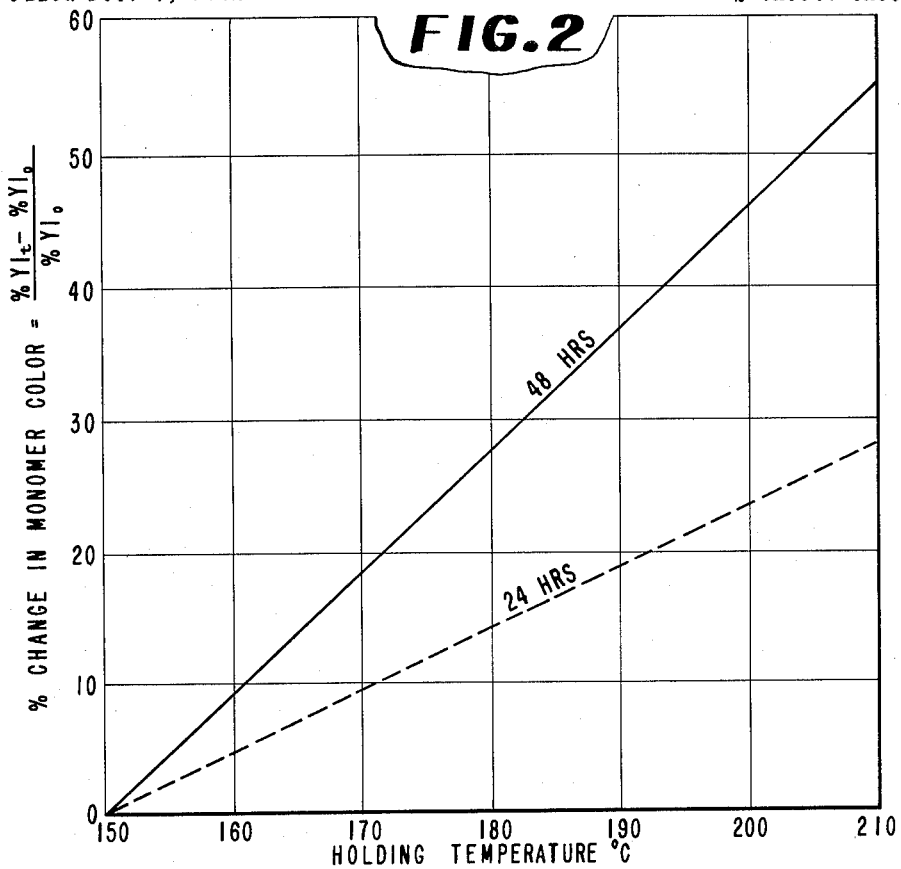
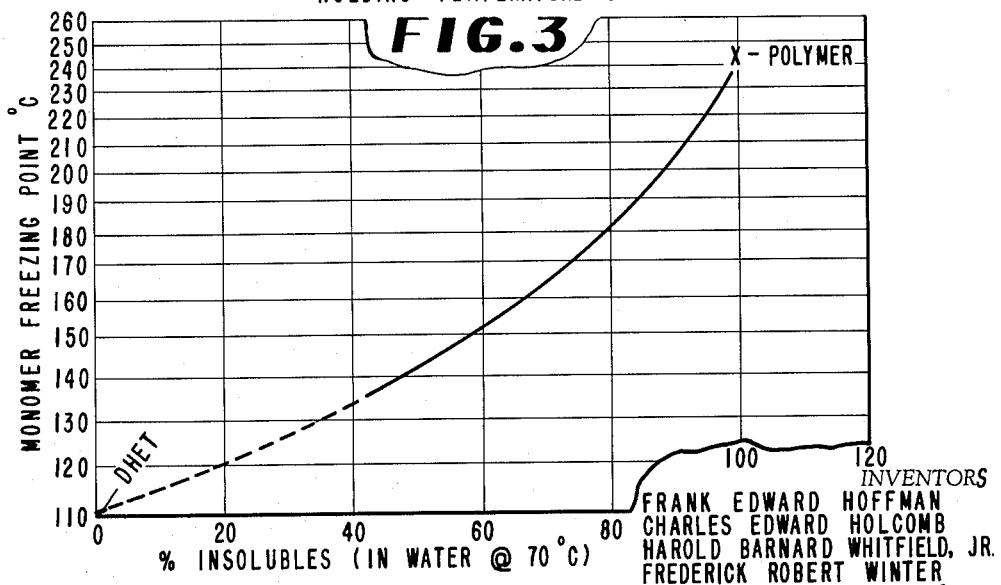

United States Patent Office 3,257,335
Patented June 21, 1966

3,257,335
TWO-STAGE PROCESS FOR DEPOLYMERIZING POLYESTERS
Harold Barnard Whitfield, Jr., Frank Edward Hoffman, and Charles Edward Holcomb, Circleville, Ohio, and Frederick Robert Winter, Newark, Del., assignors to E. I. du Pont de Nemours and Company, Wilmington, Del., a corporation of Delaware
Filed Dec. 6, 1962, Ser. No. 242,790
11 Claims. (Cl. 260—2.3)

This invention relates to a continuous process for the depolymerization of a high molecular weight polymeric ester of a dicarboxylic acid and a dihydric alcohol to low molecular weight esters of a dicarboxylic acid and a dihydric alcohol. More particularly, this invention relates to a continuous process for the depolymerization of polyethylene terephthalate to low molecular weight terephthalic acid esters of ethylene glycol.

As in the commercial preparation of polyethylene terephthalate film and fiber, a highly versatile material utilized in a great many commercial and industrial end use applications such as packing, fabrics, electrical insulators, etc., terephthalic acid or a low molecular weight alkyl ester thereof, e.g., dimethyl terephthalate is reacted under ester interchange conditions to form a monomeric ethylene terephthalate (bis-2-hydroxy-ethyl terephthalate). The monomer (actually a mixture of bis-2-hydroxy-ethyl terephthalate (DHET) and low molecular weight terephthalaic acid esters of ethylene glycol) is polymerized to the desired degree and then subjected to a series of processing steps such as extrusion into film or fiber form, quenching, stretching and heat-treating to produce a molecularly oriented article possessing excellent physical properties. In carrying out these process steps, considerable amounts of polymeric material end up in the form of scrap or waste due to a variety of causes, e.g., edge trim, reject material, etc. For reasons of economy, it is of vital necessity for this scrap material to be returned to the polymerization system. One method which has been employed for this purpose comprises chopping up the scrap material into the form of flake, and then adding it, while still solid, to the monomeric material from the ester-interchange step before it enters the polymerization stage.

This method, however, has serious drawbacks. The amount of scrap in the form of flake that can be added into the system in this manner is limited due to the differences in chemical nature between the monomer from the ester-interchange step and flake, and which leads to color formation and undesirable byproducts in the finished polymer.

Additionally, since the direct addition of flake to the polyethylene terephthalate polymerization system involves the mechanical conveyance of a dry material whose bulk density can vary considerably through a series of process steps, such as mixing and feeding into the system, the possibilities of a system upset due to plugging of the feeder lines to the mixer or feeder, clogging (bridging) of the flake on the edges of the mixing bins, or jamming of the screws of the flake feeder are considerable.

A desirable approach in overcoming the above disadvantages lies in the partial depolymerization of the waste polyethylene terephthalate to a degree sufficient to enable the reaction mixture to be blended directly with monomeric ethylene terephthalate from the ester interchange reaction or to be stored up to periods of 72 hours at temperatures sufficiently low so as not to have a detrimental effect on the color stability of the reaction material.

Efforts to conduct the conversion of high molecular weight polyethylene terephthalate flake to at least 40% DHET in a single reaction vessel wherein the flake, monomer, and glycol were added together continuously and heated at atmospheric pressure to the temperature necessary for dissolution of the flake, resulted in failure to sustain a continuous depolymerization. In all cases the reactions were terminated because of low solution temperature. The reason for this inoperability was the tendency of the glycol to boil vigorously at the required temperatures. This continuous refluxing of free glycol, by sapping the heat from the surroundings, prevented the contents of the reaction vessel from reacting sufficiently.

It is an object of this invention, therefore, to provide a continuous process for the depolymerization of a high molecular weight polymeric ester of a dicarboxylic acid and a dihydric alcohol to low molecular weight esters of a dicarboxylic acid and a dihydric alcohol.

It is a further object of this invention to provide a continuous process for the preparation of low molecular weight terephthalic acid esters of ethylene glycol from polyethylene terephthalate which is economically and quickly established and continuously maintained.

It is a further object of this invention to provide a process for the preparation of low molecular weight terephthalic acid esters of ethylene glycol from polyethylene terephthalate which, in the form of ethylene glycol solutions, can be stored as a liquid at reduced temperatures for extended periods of time without solidification or excessive degradation.

It is a still further object of this invention to provide a continuous process for the depolymerization of waste polyethylene terephthalate into low molecular weight terephthalic acid esters of ethylene glycol wherein operating conditions are constantly maintained and low molecular weight terephthalic acid esters of ethylene glycol in ethylene glycol solution are continuously withdrawn from the system, stored for extended periods of time at reduced temperatures and suitable to be blended directly with monomeric ethylene terephthalate to be polymerized.

These and other objects of this invention will be described in detail hereinafter, reference being had to the following drawings wherein:

FIGURE 1 represents a schematic flow diagram suitable for carrying out the process of the present invention;
FIGURE 2 graphically illustrates the effect of time and temperature on the monomer color;
FIGURE 3 graphically illustrates the correlation of freezing point of monomeric ethylene terephthalate at equilibrium with percent insolubles.

The process of the present invention provides a novel and effective method for the dissolution and depolymerization, on a continuous basis, of waste polyethylene terephthalate in particulate form to low molecular weight terephthalic acid esters of ethylene glycol. The process further provides efficient means for conducting a continuous depolymerization of particulate polyethylene terephthalate wherein the final product can, without further treatment, be utilized directly in the polyethylene terephthalate polymerization process.

In view of the fact that a desirable advantage of this process is to yield a depolymerized product which can be stored as a liquid for extended periods at minimum temperature without significant color or byproduct formation, the equipment and process conditions employed must be adequate to permit formation of a product having a freezing temperature below the desired storage temperature.

The term "dissolver" will be used hereinafter to refer to the first reaction zone which functions for both dissolution and partial depolymerization of the high molecular weight linear terephthalate polyester. The term "reactor" will be used herein to refer to the second reaction zone which functions to effect the ultimate degree of depolymerization.

Broadly stated, the process of the present invention comprises continuously dissolving and reacting a high molecular weight polymeric ester of a dicarboxylic acid and a dihydric alcohol, in particulate form, and an initial charge of low molecular weight esters of a dicarboxylic acid and dihydric alcohol (a mixture of monomeric ester and low molecular weight polymeric esters, i.e., dimers and trimers) in a dissolver equipped with means for agitation and operated at atmospheric pressure and at a temperature in excess of the boiling point of the dihydric alcohol and below the boiling point of the mixture of liquid components in the dissolver. It is, of course, understood that the boiling point of the mixture will vary with the composition of components in the dissolver.

The ratio of dihydric alcohol (e.g., glycol) units to dicarboxylic acid (e.g., terephthalate) in the dissolver should be greater than 1/1 (the ratio of alcohol/acid (e.g., glycol/terephthalate) in polymer is 1/1) and below the ratio which results in boiling at the dissolution temperature of the high molecular weight polymeric material. The exact ratio is selected to maximize both depolymerization and polymer dissolution without boiling. The higher ratios favor faster depolymerization but reduce the boiling temperature and thereby reduce the dissolution rate. The preferred ratio is then selected after fixing the required dissolution rate. As used herein G/T will represent the ratio of dihydric alcohol/dicarboxylic acid units. It is understood that the alcohol units may be derived from a mixture of alcohols, such as ethylene glycol and neopentyl, and that the acid units may be derived from a mixture of acids (or their alkyl esters) such as terephthalic acid and isophthalic acid.

The degee of depolymerization attainable is dependent upon both the reaction time and the equilibrium constant for the polymer system involved.

Simultaneously with the introduction of particulate polymer into the dissolver, a portion of the components in the dissolver is continuously withdrawn and passed into the second reaction zone hereinbefore defined as the reactor. Also introduced at this time into the reactor is the glycol.

In view of the fact that one portion of the effluent from the reactor is returned to the dissolver, and the remainder is drawn off for introducing into a polymerization system, the ratio of glycol (added to the reactor) to liquid effluent from the dissolver is adjusted such that the glycol/dicarboxylic acid ratio in the reactor is at an optimum to promote rapid depolymerization while minimizing glycol addition which lowers the boiling temperature of the liquid effluent from the reactor. This liquid effluent, when recycled to the dissolver and mixed with the liquid mass in the dissolver, must not boil at atmospheric pressure.

The reaction mixture in the reactor is maintained at a room temperature at least as high as the dissolver temperature, preferably higher, to promote faster depolymerization but below the temperature at which any of the liquid products degrade or polymerize, preferably the glycol, to form undesirable by-products.

The pressure in the reactor must be in excess of the vapor pressure of the liquid glycol. The reactor is preferably a vessel with means known to the art for thorough mixing of the reaction components to insure homogenity of the mixture and uniform reaction time.

While the present invention is described and exemplified with reference to the continuous depolymerization of polyethylene terephthalate, it is to be understood that the process of the present invention can be applied to the depolymerization of other polyesters. By polyester is meant a linear polyester which contains the recurring structural formula:

—O—G—OOC—T—CO— wherein —G— represents a divalent organic radical containing from 2 to 10 carbon atoms and attached to the adjacent oxygen atoms by saturated carbon atoms. Thus, the radical —G— can be of the form —CH$_2$A$_m$CH$_2$—, where $m$ is 0 or 1 and A represents an alkylene radical, a cycloakylene radical, a bis-alkylene ether radical, or other suitable organic radical. The radical —T— represents a divalent aliphatic radical or aromatic radical. Thus, the radical —T— can be of the form —(CH$_2$)$_n$—, wherein $n$ is greater than unity, or

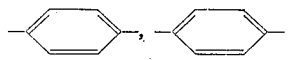, 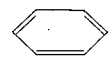

and the like.

The polyesters can be prepared by reacting a dicarboxylic acid or an ester-forming derivative thereof with a glycol, G(OH)$_2$, where —G— is a radical as defined above, to form the bis-glycol ester of a dicarboxylic acid, followed by polycondensation at elevated temperature and reduced pressure with elimination of excess glycol. Examples of suitable glycols include ethylene glycol, diethylene glycol, propylene glycol, butylene glycol, decamethylene glycol, neopentyl glycol, and trans-bis-1,4-(hydroxymethyl) cyclohexane. Mixtures of one or more glycols can be used. Examples of suitable acids include adipic, sebacic, isophthalic, azelaic, malonic, bibenzoic and hexahydroterephthalic, 1,5-naphthalene dicarboxylic, 2,6-naphthalene dicarboxylic and 2,7-naphthalene dicarboxylic. The preferred polyesters are linear terephthalate polyesters where "T" in the above structural unit is

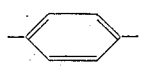

and wherein the polyester contains at least 50% of said terephthalate structural unit.

Similarly, copolyesters can be formed by replacing some of the dicarboxylic acid or derivative thereof with another dicarboxylic acid or ester-forming derivative thereof. Such acids have been set forth above.

More specifically, the process of the present invention comprises continuously dissolving and reacting polyethylene terephthalate, in particulate form, and an initial charge of monomeric ethylene terephthalate in a dissolving zone equipped with means for agitation and operated at atmospheric pressure and at a temperature in excess of 210° C., preferably 220° C. to 225° C., but in no case should the temperature exceed 260° C. The reaction is continued for a length of time sufficient to reduce the level of insoluble matter to less than 80% and preferably less than 70%. By insoluble matter is meant all the unreacted polyethylene terephthalate and partially depolymerized polymeric ethylene terephthalates, therefore, 100 minus percent insolubles in the case of polyethylene terephthalate is a measure of percent conversion of high molecular weight polymer to DHET. These materials, insoluble in water at 70° C. represent that portion of the reaction solids which have not been converted to DHET.

The ratio of particulate polyethylene terephthalate and monomeric ethylene terephthalate added to the reaction vessel to form the initial charge is adjusted such that the ratio of ethylene glycol units (G) to terephthalate units (T) is within the range of about 1.4 to 1.9, preferably 1.4 to 1.7 and most preferably 1.6. When the level of insolubles in the first reaction zone is determined by test to be below 80%, the temperature in the first reaction zone is increased to at least 225° C., preferably 230 to 240° C. and most preferably 235° C. and particulate polyethylene terephthalate is introduced on a continuous basis at a predetermined rate.

Simultaneously with the introduction of particulate polyethylene terephthalate into the dissolving zone, a portion of the components in the dissolving zone is continually withdrawn and passed into the reactor. Also introduced at this time into the reactor is ethylene glycol. The ratio of ethylene glycol to the material from the dissolver introduced is adjusted such that the G/T ratio is at least 1.8, preferably at least 1.9.

The reaction mixture in the reactor is maintained at a temperature of at least 220° C., preferably 230 to 250° C. and most preferably 240° C. and at a pressure in excess of that of the vapor pressure of the liquid ethylene glycol at the temperature employed in the reactor.

When starting up, the components in the reactor are allowed to react for sufficient time while passing through the reactor such that the level of insolubles is reduced to less than about 70%, i.e., the product upon returning to the dissolver does not boil. When the material from the reactor shows less than about 60% insolubles remaining, part of this material is removed from the system as the product and it is transferred either to storage or directly to a system for the polymerization to high molecular weight polymer. The remainder is recycled back into the dissolver. It may be necessary, in order to obtain about 60% insolubles level, to recycle the material from the reactor, one or more times, back into the dissolver. Of course, if the level of insolubles is reduced below 60% on the initial pass through the reactor, no further complete recycling is necessary, prior to commencement of continuous addition of polymer and glycol and continuous withdrawal of depolymerized product.

Simultaneously, the material balance is adjusted by the addition of particulate polyethylene terephthalate to the dissolver and ethylene glycol to the reactor. The ratio of the amount of material being recycled to the amount being removed from the system is adjusted such that the G/T in the dissolver is maintained constantly at a 1.4 to 1.9 level and the ratio in the reactor is at least 1.8.

A schematic flow diagram suitable for carrying out the process of the present invention is shown in FIGURE 1. Referring to this diagram, particulate polyethylene terephthalate on a continuous basis (also the initial charge of monomeric ethylene terephthalate) is fed into the dissolver vessel 10 through inlet 11. The dissolver is equipped with heating means 12 and means for agitation 13 of the vessel contents. A screen filter 33 is placed at the bottom of the dissolver over the outlet line 16. Heating of the vessel can be accomplished by any conventional means. One method as shown in FIGURE 1 is to pass heated oil from an oil heater 14 through the lining of a jacket surrounding the dissolver. Sufficient agitation of the components in the dissolver is a critical need for heat transfer, to minimize the spread in particle residence time and to mix adequately the recycle stream from the reactor.

Since the G/T ratio of the ingredients in the dissolver should be kept at a level within the range of 1.4 to 1.9, the material being continuously recycled from the reactor 15 (G/T=1.9) and the polyethylene terephthalate flake (G/T=1) being constantly added to the dissolver must be quickly blended into a homogeneous mixture so as to avoid any refluxing of the glycol which might occur if significant quantities of the recycle material were permitted to remain unmixed. By utilizing agitation and introduction of the returning liquid stream under the surface of the reaction mass, this problem is avoided. After the dissolver, the material has a G/T ratio of 1.4 to 1.9 and a level of percent insolubles of less than 80%.

The material is continuously passed from the dissolver through outlet 16 into a heated reactor 15 through inlet 17. This reactor is equipped with means (not shown) for securing substantially equal residence time for each unit of material passing through. The ethylene glycol is introduced on a continuous basis through line 18. The ethylene glycol is first passed from a storage tank 19, is pressured by pump 20 and then passed through a heating device 21 where it is heated to the reaction temperature.

Pressure is applied to the heated reactor by means of a pump 22. The amount of pressure to which the reactants must be subjected will depend on the temperature employed for carrying out the reaction in the reactor. The pressure should be in excess of the vapor pressure of ethylene glycol at the temperature employed in the reactor. The minimum pressure necessary can be established by the vapor pressure of the glycol.

From the reactor, the reaction mass is conducted through outlet 23 where it can be recycled completely back into the dissolver through inlet 24 or a portion can be carried out of the system into a cooling vessel through line 25. Here the reaction product can be cooled in a product cooler 26 for storage or for further processing.

Samples from the dissolver for product analysis can be withdrawn from valve 27. The control of flow of reaction products to the dissolver and product cooler is controlled by valve 28. Samples for product analysis from the reactor are taken through valve 30. The product line 31 is equipped with a valve 32 to release the pressure to atmospheric.

A study of thermodynamic and kinetic relationships of the polyethylene terephthalate degradation reaction reveals that ethylene glycol can be introduced directly into the mixture of monomeric ethylene terephthalate and particulate polyethylene terephthalate in the dissolver without refluxing of the ethylene glycol providing the level of insolubles is kept below 60%. However, without introduction of the ethylene glycol into a separate reactor under pressure, the level of insolubles will increase rapidly since the conversion rate to DHET and low molecular weight polymer is not fast enough relative to the addition rate of insolubles introduced in the form of particulate polyethylene terephthalate.

Also, the ratio of particulate polyethylene terephthalate to monomeric ethylene terephthalate introduced into the dissolver must be adjusted such that the G/T ratio (particulate polyethylene terephthalate has a G/T ratio of approximately 1.0) ranges between about 1.4 and 1.9. With a G/T ratio greater than about 2.0, refluxing of ethylene glycol will result at the temperatures necessarily employed to attain the desired level of insolubles. A G/T ratio less than about 1.4 will not permit the conversion reaction to proceed at sufficiently high rates of speed.

The study further reveals that to permit storage of the reaction product at temperatures sufficiently low to prevent color formation and polymerization, the percent insolubles must be no greater than 60%.

In FIGURE 2, the percent change in color [1] in monomeric ethylene terephthalate held in a storage vessel is plotted against the time and temperature. In this illustration, monomeric ethylene terephthalate (containing a minimum of 40% DHET) is held at various temperatures for periods of 24 and 48 hours. From the figure it can be seen that in order to maintain the change of color to a minimum (less than 10%), the holding temperature (without agitation) must be less than 175° C.

FIGURE 3 graphically illustrates the effect of percent insolubles on the freezing point of the terephthalic acid ester solution. From this graph and FIGURE 2 it can be seen that the level of insoluble matter in the reaction mass must not exceed 60% for the material to be held in storage for any length of time.

An analysis of the above-described kinetic and thermodynamic relationships and laboratory data points out the

---

[1] The color of the monomer is obtained by measuring the reflectance of a monomer molding compared to a known white source. The reflectance is measured on a standard "colormaster" manufactured by Manufacturer Equipment Company. The sample of monomer is prepared by heating the material to 235° C. to achieve constant G/T and pouring the liquid monomer into a mold (approximately 3″ diameter x 1″ thick). The mold is allowed to cool and the monomeric molding is removed. Since a polished plate is used for one side of the mold, this side of the monomer plack is placed on the "colormaster" and the percent reflectance at the blue and green wavelengths is measured. The percent yellowness is then calculated:

$$\text{Percent yellowness} = \left(1 - \frac{\text{percent blue reflectance}}{\text{percent green reflectance}}\right) \times 100$$

Percent $YI_t$ = percent yellowness of monomer at time $t$
Percent $YI_o$ = yellowness initially.

criticality of the process steps of the present invention. It is necessary, in order to obtain a desired level of insolubles in the reactor that a $G/T$ ratio of at least 1.8 and temperatures in excess of 220° C. be employed. To prevent refluxing of the ethylene glycol in the initial mixture of polyethylene terephthalate and monomeric ethylene terephthalate, the $G/T$ ratio must be maintained at a level ranging between 1.4 to 1.9. Also, to permit storage for extended periods of time at operable temperatures (below that at which polymerization and color formation occur and above that at which the solution freezes), the percent insolubles of the reaction mass must not exceed 60%, preferably 50%.

The process of the present invention satisfies these three requisites by providing for introduction of glycol without boiling, reducing the chain length distribution of the product and providing a product which can be stored for extended periods of time at operable temperatures without excessive increase in color, solidification and other reaction products.

In order to prevent refluxing of the ethylene glycol in the initial charge, ethylene glycol is introduced into the reaction mixture in the reactor under sufficient pressure so that reaction can take place. By continuously recycling sufficient quantities of the reaction material back into the dissolver to which the polyethylene terephthalate flake is being continuously introduced, the $G/T$ ratio in that vessel is maintained at a constant level of 1.4 to 1.9. The product constantly being withdrawn from the reaction has a sufficiently low insolubles level so that it can be satisfactorily stored at lower temperatures without excessive increase in color.

Since the process conditions are precisely defined, the length of reaction time employed in this process will depend largely upon the quantity of the particulate polyethylene terephthalate desired to be processed. Accordingly, the size of the reactor will depend upon the length of time desired to complete one cycle of the process. For example, if it is desired to process 4,000 pounds of particulate polyethylene terephthalate in the form of flake in one hour, it is found that operating wtihin the process limitations specified above, and by maintaining a strictly controlled material balance, that a seven minute cycle will be adequate to produce a reaction product which had a melting point of 146° C. This indicates, as shown in FIGURE 3, that the corresponding percent insolubles is 55%.

Such a product can be safely stored for extended periods at a temperature of 150–160° C. with agitation or 170–180° C. without agitation. This is well within the operable limits.

The process of the present invention can be more fully understood by the following examples:

*Example 1*

The apparatus employed for carrying out the polyethylene terephthalate depolymerization reaction is shown in FIGURE 1.

A 30-gallon capacity dissolver is filled with 40 pounds of monomeric ethylene terephthalate from the ester interchange reaction between ethylene glycol and dimethyl terephthalate. The analysis of this monomer shows a $G/T$ ratio of 2.0, a freezing point of 146° C. or 55% insolubles. The contents of the vessel are heated to 220° C. by circulating heated oil through the jacket of the vessel. The liquid monomer is agitated by a 0.5 H.P. "Lightnin" mixer. To prevent passage of undissolved flake into the recirculating monomer stream, the dissolver is equipped with a 40-mesh screen filter.

The oil heated reactor is sized so as to allow for a seven minute reaction cycle at a particulate polyethylene terephthalate rate of addition of 0.24 pound per minute. From the dissolver, the monomer is then circulated through the reactor, the reactor being a jacketed, straight length of pipe. The circulating fluid in the reactor is held at 235–240° C. and a pressure of 35 p.s.i.g. After leaving the reactor, the monomer is returned to the dissolver.

After one hour of circulating monomer at operating conditions, particulate polyethylene terephthalate in flake form having a melting point of 240° C. or 100% insolubles and a $G/T$ ratio of 1.0 is added to the dissolver. 0.24 lb./min. of flake is added so as to reduce the $G/T$ ratio of material in the dissolver from 2.0 to 1.6. Flake is added slowly to permit dissolution without plugging the screen. With the required amount of flake added (20 lb.), the temperature of the dissolver is increased to 235° C.

The speed of the positive displacement transfer pump in the dissolver outlet line is adjusted such that its capacity in lb./min. plus the rate of glycol addition provides an average contact time in the reactor of about 7.5 min. (7.2 lb./0.964 lb./min.). The pressure in the dissolver outlet line is atmospheric plus the liquid head before the transfer pump and 35 p.s.i.g. after the pump. The temperature throughout the line is 235–240° C. The volume of the reactor is 7.2 lb. of monomer. The monomer transfer rate is 0.89 lb./mm. The average contact time in the dissolver is 60 min. (53 lb./0.89 lb./min.).

With the dissolver at 235° C., atmospheric pressure and a $G/T$ ratio of 1.6 and the reactor at 240° C., 35 p.s.i.g. and a $G/T$ ratio of 1.6, the continuous feeding of flake and ethylene glycol is begun. The glycol rate is 0.074 lb./min. which achieves a $G/T$ ratio of 1.9–2.0 in the reactor based on the flake being fed to the dissolver. The glycol is first passed through a preheater under a pressure of 35 p.s.i.g. to raise its temperature to the temperature of the material in the reactor (240° C.). With the establishment of flake and glycol flow, the draw-off of monomer through the product cooler maintained at 35 p.s.i.g. is begun. The monomer product is cooled from 240–218° C. by the heat transfer fluid maintained at 175° C. Pressure is then reduced to atmospheric.

The draw-off rate of 0.314 lb./min. and recycle rate of 0.65 lb./min. maintains proper material balance with the incoming flake and glycol. Control of the recycle monomer stream by the valve in the recirculating line controls and adjusts the pressure in the reactor.

With the establishment of continuous flow, the course of the reaction is followed by the analysis of monomer samples taken from the dissolver through a valve in the outlet line, from the reactor and from the cooler. The degree of conversion may be determined by the change, or reduction, in freezing points across the dissolver and reactor. The relationship of freezing point and percent insolubles shown in FIGURE 2 is employed for this purpose.

The process is operated in this manner for 30 hours without difficulty. The change in freezing points across the reactor shows the change in percent insolubles. The reaction conditions level off after three hours and remain constant throughout the operating period.

During the 30-hour run, the average freezing point of monomer from the dissolver is 194° C. or 86% insolubles and has a $G/T$ ratio of 1.4–1.6 and the freezing point of monomer after the reactor is 149° C. or 58% insolubles and has a $G/T$ ratio of 2.0. Thus, the net degree of conversion to DHET is 86% to 58% or a change of 28%. These freezing points are higher than preferred but are a function of the hold up time in the reactor.

The low freezing point of the monomer indicates that the material can be stored at a suitable temperature without serious color increase or solidification.

*Example 2*

The method of Example 1 is followed with the exception that the feed rates are adjusted to operate at twice the hold-up time in the reactor. This means that the flake feed rate is 0.113 lb./min., the monomer transfer rate is 0.460 lb./min., the glycol feed rate is 0.042 lb./min., the product take-off rate is 0.153 lb./min. and the recycle rate is 0.349 lb./min.

Since the reactor capacity is 7.2 lbs., the average contact time in the reactor is 14.4 minutes $$\left(\frac{7.2 \text{ lbs.}}{0.460 + 0.042 \text{ lbs./min.}}\right).$$

46 lb. of monomeric ethylene terephthalate is initially charged into the dissolver.

In this example, the dissolver is operated at atmospheric pressure and 232° C. while the reactor and glycol preheater are operated at 35 p.s.i.g. and 245° C. The unit is operated for 6 hours upon the establishment of operating conditions.

Analysis of the monomer from the system shows that the freezing point of the monomer from the dissolver is 180° C. or 79% insolubles and has a G/T ratio of 1.5. The melting point of the monomer product and of the monomer after the reactor is 151° C. or 60% insolubles and has a G/T ratio of 2.0. This monomer is stored at 160° C. for 48 hours without agitation resulting in no substantial color increase.

The process of the present invention provides a novel, highly effective method for the continuous conversion of waste or reject polyethylene terephthalate to terephthalate esters of ethylene glycol. This process represents an outstanding technological advance over methods now known and employed by the art for regeneration of non-useable polyethylene terephthalate and the reintroduction of that material back into the polymerization process. One of the many advantages of this process over prior art methods is that the regenerated polyethylene terephthalate in the form of terephthalate esters of ethylene glycol (principally DHET) can be either added directly back into the polymerization system or can be stored for extended periods of time.

Unlike particulate polyethylene terephthalate which can vary widely in bulk density, the depolymerized polyethylene terephthalate in the form of a liquid stream, is much easier to control and is of uniform composition. Problems arising from variances in flow patterns with particulate polyethylene terephthalate are not encountered. Moreover, system upsets due to plugging of the feeder lines or clogging of the dry material in the mixing bin, cannot interrupt the continuous polymerization system.

A further advantage is that a reactor can be designed for permitting each unit of material to have substantially equal residence time. Thus, the product uniformity is improved which works to advantage in controlling subsequent processing steps.

What is claimed is:

1. The process comprising: continuously dissolving and reacting without vaporization and refluxing a high molecular weight polymeric ester of a dicarboxylic acid and dihydric alcohol with low molecular weight esters of dicarboxylic acid and a dihydric alcohol, for a time sufficient to convert said high molecular weight polyester to a liquid reaction product, in a first reaction zone maintained at a temperature above the boiling point of dihydric alcohol used in the manufacture of said polyester, the ratio of the two components being such that the ratio of alcohol units to acid units is above 1:1 and below the ratio which results in boiling of said two components at said temperature; continuously withdrawing said liquid product from said first reaction zone and passing said product simultaneously with the dihydric alcohol used in the manufacture of said polyester into a second reaction zone maintained at a temperature within the range of a temperature at least as high as the temperature in said first reaction zone and below the temperature at which any of the liquid products degrade and at a pressure in excess of the vapor pressure of said dihydric alcohol at the temperature employed and continuously removing part of the resulting liquid effluent from said second reaction zone as product and recycling the remainder back to said first reaction zone, the ratio of alcohol units to acid units in said second reaction zone being such that the liquid effluent when recycled and mixed with the components in said first reaction zone does not boil.

2. The process of claim 1 wherein the high molecular weight polyester is polyethylene terephthalate, the low molecular weight esters of a dicarboxylic acid and a dihydric alcohol are low molecular weight terephthalic acid esters of ethylene glycol and the dihydric alcohol is ethylene glycol.

3. The process comprising: continuously contacting and reacting polyethylene terephthalate with low molecular weight terephthalic acid esters of ethylene glycol in a first reaction zone maintained at a temperature of at least about 210° C., the ratio of the two components being such that the ratio of ethylene glycol units to terephthalate units is within the range of about 1.4 to 1.9, for a time sufficient to convert said polyethylene terephthalate to a liquid reaction product; continuously withdrawing said liquid product from said first reaction zone and passing said product into a second reaction zone maintained at a temperature of at least about 220° C. and a pressure in excess of the vapor pressure of the glycol at the temperature employed; continuously adding with said liquid product to said second reaction zone ethylene glycol at a rate so as to maintain in said second reaction zone an ethylene glycol to terephthalate ratio of at least about 1.8 and continuously removing part of the resulting low molecular weight terephthalic acid esters of ethylene glycol from said second reaction zone as product having a level of insolubles less than about 60% and recycling the remainder back to said first reaction zone.

4. The process of claim 3 wherein the low molecular weight terephthalic acid esters of ethylene glycol are derived from the ester interchange reaction between ethylene glycol and dimethyl terephthalate.

5. The process of claim 3 wherein the temperature of the first reaction zone is maintained at about 235° C., the temperature of the second reaction zone is maintained at about 240° C., the ratio of ethylene glycol units to terephthalate units in the first reaction zone is maintained at about 1.6 and the ratio of ethylene glycol units to terephthalate units in the second reaction zone is maintained at about 1.9.

6. A process for the depolymerization of polyethylene terephthalate comprising: charging into a first reaction vessel, and agitating, particulate polyethylene terephthalate and low molecular weight terephthalic acid esters of ethylene glycol, the ratio of the two components being such that the ratio of ethylene glycol units to terephthalate units is within the range of about 1.4 to 1.7; reacting said components in said vessel at atmospheric pressure and a temperature of at least 210° C. for a time sufficient to reduce the level of insoluble matter in the liquid reaction product to less than about 80%; simultaneously and continuously initiating (1) the addition of particulate polyethylene terephthalate to said vessel, (2) the withdrawal of said liquid reaction product from said vessel and passing said liquid product into a second reaction vessel and (3) the addition into said second vessel of heated ethylene glycol at a rate so as to maintain the ratio of ethylene glycol units to terephthalate units in the second vessel at about 1.9; continuously reacting said components in said second vessel while passing through said second vessel at a temperature of at least 220° C. and a pressure in excess of the vapor pressure of ethylene glycol at the temperature employed for a time sufficient to reduce the level of insoluble matter in the reaction product to less than 70% and continuously removing part of the resultant product from said second reaction vessel when the level of insoluble matter in said resultant product is less than 60% and recycling the remainder back to said first reaction vessel, the ratio of product removed from said second vessel to the product being recycled to said first vessel being adjusted, together with the rates of addition of said particulate polyethylene terephthalate, said ethylene glycol and said withdrawn liquid reaction product from said first vessel, so that the ratio of ethylene glycol units to terephthalate units in said first vessel is continuously maintained within the range of about 1.4 to 1.7.

7. The process of claim 8 wherein the low molecular weight terephthalic acid esters of ethylene glycol are derived from the ester interchange reaction between ethylene glycol and dimethyl terephthalate.

8. The process of claim 6 wherein the temperature of the second reaction vessel is continuously maintained at about 240° C.

9. The process of claim 6 wherein the temperature of the first reaction vessel is continuously maintained at about 235° C.

10. The process of claim 6 wherein the ratio of ethylene glycol units to terephthalate units in the first reaction vessel is continuously maintained at about 1.6.

11. The process of claim 6 wherein the ratio of ethylene glycol units to terephthalate units in the second reaction vessel is continuously maintained at about 1.9.

References Cited by the Examiner
FOREIGN PATENTS
490,032   1/1953   Canada.

MURRAY TILLMAN, *Primary Examiner.*

DONALD E. CZAJA, *Examiner.*

J. A. KOLASCH, W. L. BASCOMB, *Assistant Examiners.*